(12) United States Patent
Kuczma et al.

(10) Patent No.: US 7,082,239 B2
(45) Date of Patent: Jul. 25, 2006

(54) PROTECTED OPTICAL FIBER CABLE AND HYDROGEN GETTERING AGENT

(75) Inventors: Andrew S. Kuczma, Clinton, CT (US); Robert Buxbaum, Oak Park, MI (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/463,216

(22) Filed: Jun. 17, 2003

(65) Prior Publication Data

US 2004/0258371 A1    Dec. 23, 2004

(51) Int. Cl.
*G02B 6/44* (2006.01)
(52) U.S. Cl. .................................... 385/100
(58) Field of Classification Search ......... 385/100–114
See application file for complete search history.

(56) References Cited

U.S. PATENT DOCUMENTS

| 6,404,961 | B1 * | 6/2002 | Bonja et al. ............... 385/109 |
| 2002/0126969 | A1 | 9/2002 | Bonja et al. |
| 2004/0016769 | A1 * | 1/2004 | Redmond ..................... 222/3 |
| 2004/0109652 | A1 * | 6/2004 | Risch et al. ................ 385/102 |

FOREIGN PATENT DOCUMENTS

EP    0 538 864    4/1993

OTHER PUBLICATIONS

U.K. Search Report, Application No. GB 0413540.6, dated Oct. 29, 2004.
Drs. Raouf O. Loutfy, Alexander P. Moravsky and Eugene M. Wexler, Production and Characterization of Fullerene Hydrides, Materials and Electrochemical Research (MER) Corporation, Tucson, Arizona, 85706, USA, Oct. 10, 2000.

* cited by examiner

*Primary Examiner*—Khiem Nguyen

(57) ABSTRACT

The present invention generally provides a hydrogen gettering agent containing a fullerene compound, a protected optical fiber cable containing the hydrogen gettering agent and a method of making the same. According to some embodiments, the protected optical fiber cable is provided comprising a protective sheath, at least one optical fiber positioned within the protective sheath, and the hydrogen gettering agent surrounding the at least one optical fiber within the protective sheath.

17 Claims, 4 Drawing Sheets

PROTECTED OPTICAL FIBER CABLE AND HYDROGEN GETTERING AGENT

FIELD OF THE INVENTION

The present invention generally relates to fiber optic cables, and more specifically relates to hydrogen gettering agents for use with fiber optic cables subjected to harsh environments, and for other similar applications.

BACKGROUND OF THE INVENTION

There is an increasing need for low toxicity, low flammability liquid hydrogen gettering agent that can be used, for example, to help fiber optic cables survive the harsh environment encountered in down-hole fiber optic sensing applications. Such fiber optic cable is used, for example, to interconnect a down-hole fiber optic sensor with instrumentation located at the surface of a well bore.

Down-hole environmental conditions typically include high temperatures and high partial pressures of hydrogen. Both molecular ($H_2$) and atomic (H) hydrogen from various sources, such as environmental hydrogen sulfide ($H_2S$) and the corrosion of metallic components, may be present in the down-hole environment. It is well known that hydrogen permeation into optical fibers can significantly decrease the power of light transmitted through the fibers. Therefore, the fibers in these cables are typically protected from hydrogen by various combinations of hydrogen barriers (such as gold, aluminum or copper layers) and hydrogen gettering agents.

Typically, these gettering agents are metallic (Y, Pd, Zr) or metal catalyzed unsaturated organic molecules that are dissolved or suspended in a petroleum or synthetic gel. These gettering gels are typically deployed within the inner diameter of an inner cable sheath, in intimate contact with the optical fibers. The function of these agents is to scavenge any hydrogen passing through the hydrogen barrier layer(s). Liquid gels are typically preferred to solids because they are easier to deploy within a cable. A shortcoming associated with existing gettering gels is their limited stability and $H_2$ scavenging density. A common gettering gel, sold under the trade name Sepigel (available from Seppic Corp. of Fairfield, N.J.), for example, will scavenge roughly three cubic centimeters (cc) of $H_2$ per gram at standard temperature and pressure, or 0.1348 grams-mole per kilogram (g-mole/kg). This is insufficient for high-density hydrogen exposure in some down-hole environments. Though the composition of Sepigel is a trade secret, typical unsaturated organic compounds found in gettering gels require a catalyst to promote appreciable hydrogenation, making it more complicated and more costly to manufacture a suitable agent, and making it hard to achieve high stability, low toxicity, and low flammability.

Thus, there is a need for an improved hydrogen gettering gel for use with down-hole optical fiber cables and similar applications.

SUMMARY OF THE INVENTION

One embodiment of the present invention provides a fiber optic cable comprising an protective sheath, at least one optical fiber positioned within the protective sheath, and a gettering agent surrounding the at least one optical fiber within the protective sheath, wherein the gettering agent contains a fullerene compound.

Another embodiment of the present invention provides a gettering agent for use with a fiber optic cable, the gettering agent comprising a fullerene compound dissolved or suspended in a solvent.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

The present invention aims to provide a fiber optic cable that is more hydrogen resistant than those available in the prior art. Existing hydrogen gettering agents used in the manufacture of fiber optic cables are capable of scavenging limited densities of hydrogen and may prove less effective in many high-density hydrogen exposure environments. The present invention provides hydrogen gettering agents containing compounds that are non-toxic, high capacity, non-flammable, stable and active at appropriate temperatures without the need for a metallic catalyst. These gettering agents may be used to manufacture fiber optic cables that may be deployed at higher temperatures and higher $H_2$ partial pressures than those in the prior art.

A particularly attractive new hydrogen getter is the class of buckminsterfullerenes, popularly known as buckyballs. Buckminsterfullerenes are highly unsaturated, and thus provide a large number of available sites for hydrogen absorption. Further, resonance stability keeps the buckyballs from polymerizing, a problem with several other potential hydrogen gettering materials. Still further, buckyballs do not need a catalyst to enable them to getter hydrogen at relatively low temperatures, so long as they are dissolved in a solvent. While buckyballs typically exhibit a relatively low solubility in solvents (e.g., 3% by weight in benzene or Sepigel) when compared to conventional getters, the high gettering capacity still allows for high hydrogen gettering capacities relative to the materials that are typically stable in down-hole environments.

For some embodiments of the present invention, buckminsterfullerene may be suspended in a liquid solvent, such as benzene. However, to facilitate deployment for applications like protecting optical fiber, for other embodiments, the buckminsterfullerene may be suspended in a gel solvent. It will be appreciated by those skilled in the art that several gel solvents, including Sepigel, are non-toxic and non-flammable (unlike benzene, which is toxic, carcinogenic, flammable and highly regulated) and thus may be advantageously adapted to benefit from the present invention.

Figure 1:
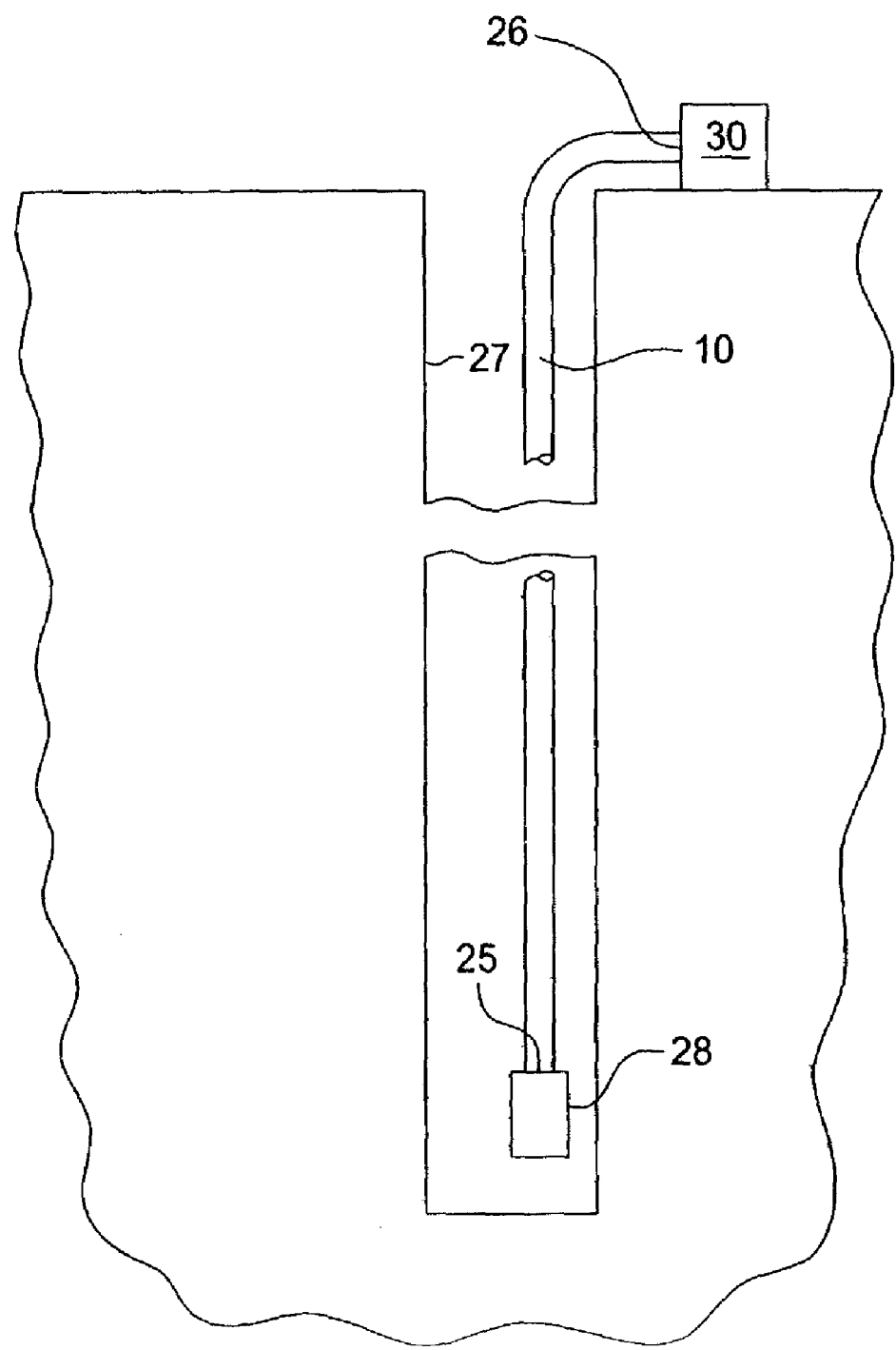
FIG. 1 is a perspective view of an illustrative fiber optic cable that may be adapted to benefit from the present invention.

FIG. 1 is a perspective view of an illustrative fiber optic cable 10 that may be adapted to benefit from the present invention. The cable 10 may be used in a well bore 27 of an oil or gas well; however, the present invention is not limited in utility to solely down-hole applications. Optical fibers (16, 17 in FIG. 2) are selected to provide reliable transmission of optical signals between a first end 25 and a second end 26 of the cable 10. For example, the signals may be transmitted between a fiber optic sensor 28 positioned with the well bore 27 (e.g., proximate the first end 25) and optical processing equipment 30 located outside the well bore 27 and above ground (e.g., proximate the second end 26). It is the molecular and atomic hydrogen present within the well bore 27 that decreases optical power and therefore compromises the reliability of the optical signals transmitted between the first and second ends 25, 26 of the cable 10.

Figure 2:
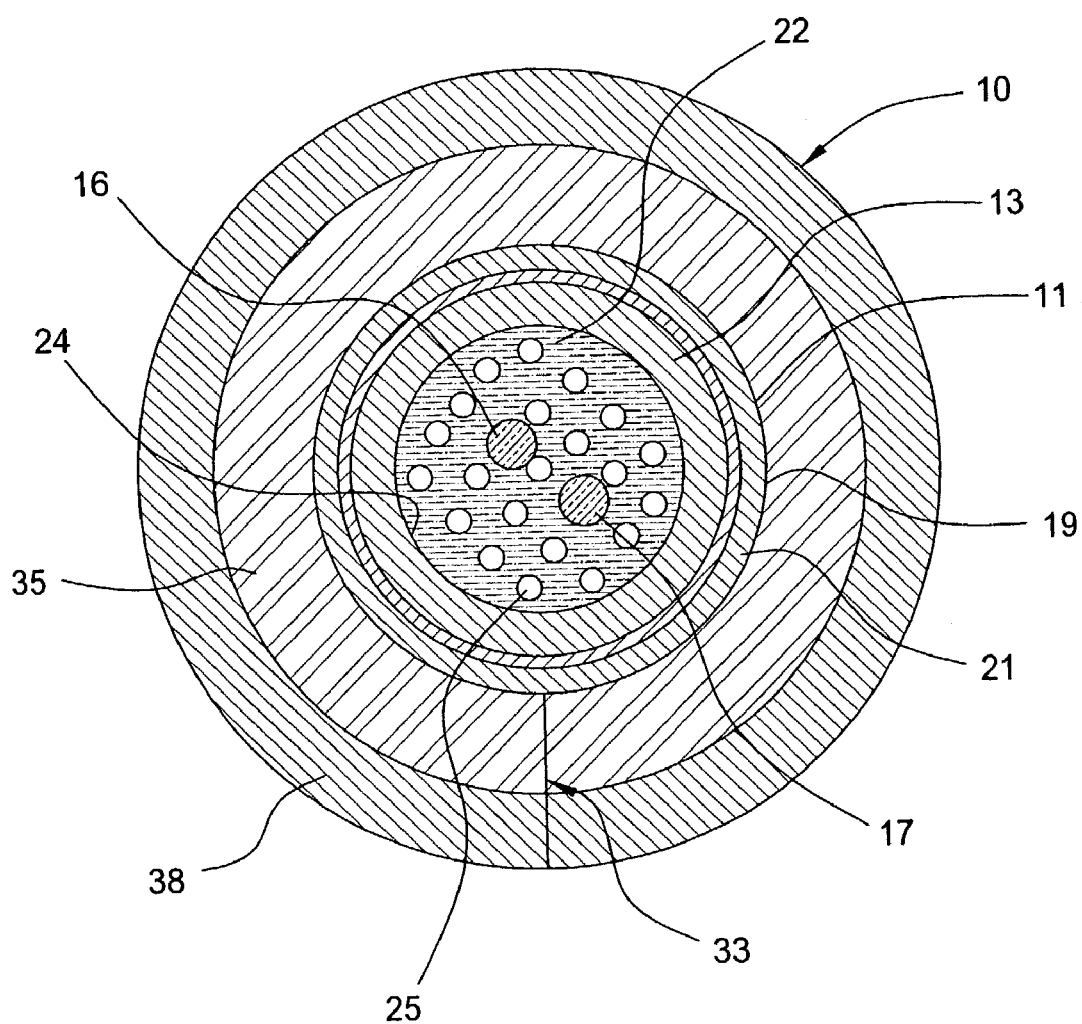
FIG. 2 is a cross-sectional view of one embodiment of a fiber optic cable employing the hydrogen gettering agent of the present invention.

FIG. 2 is a cross-sectional view of one embodiment of a fiber optic cable 10 employing the hydrogen gettering agent of the present invention. The cable 10 includes a protective sheath 13 surrounding one or more optical fibers 16, 17. Although FIG. 2 depicts a cable 10 having two optical fibers 16, 17, it is to be appreciated by those skilled in the art that any number of optical fibers may be used; however, the number is limited by the diameter of the protective sheath 13 such that sufficient space must be provided to prevent microbending of the optical fibers during handling and deployment of the cable 10. The protective sheath 13 is surrounded by one or more outer protective layers 33 that may optionally include a fiber in metal tube (FIMT) core 11, buffer material 35 and/or an outer tube 38.

The protective sheath 13 may be a laser welded tube, e.g., a length-wise laser welded tube, manufactured from any suitable material, including a corrosion resistant material, such as a corrosion resistant metal alloy or a high-strength polymer. The protective sheath 13 diameter may be in the range of 1.1 to 2.6 mm, and in an exemplary embodiment of the invention is 2.4 mm. Although the protective sheath 13 is described as being 1.1 to 2.6 mm in diameter, the diameter of the protective sheath may vary over a wide range, depending upon the materials used and the number of optical fibers to be placed in the protective sheath 13. The protective sheath wall thickness is selected to be sufficient for the laser welding process.

Figure 4:
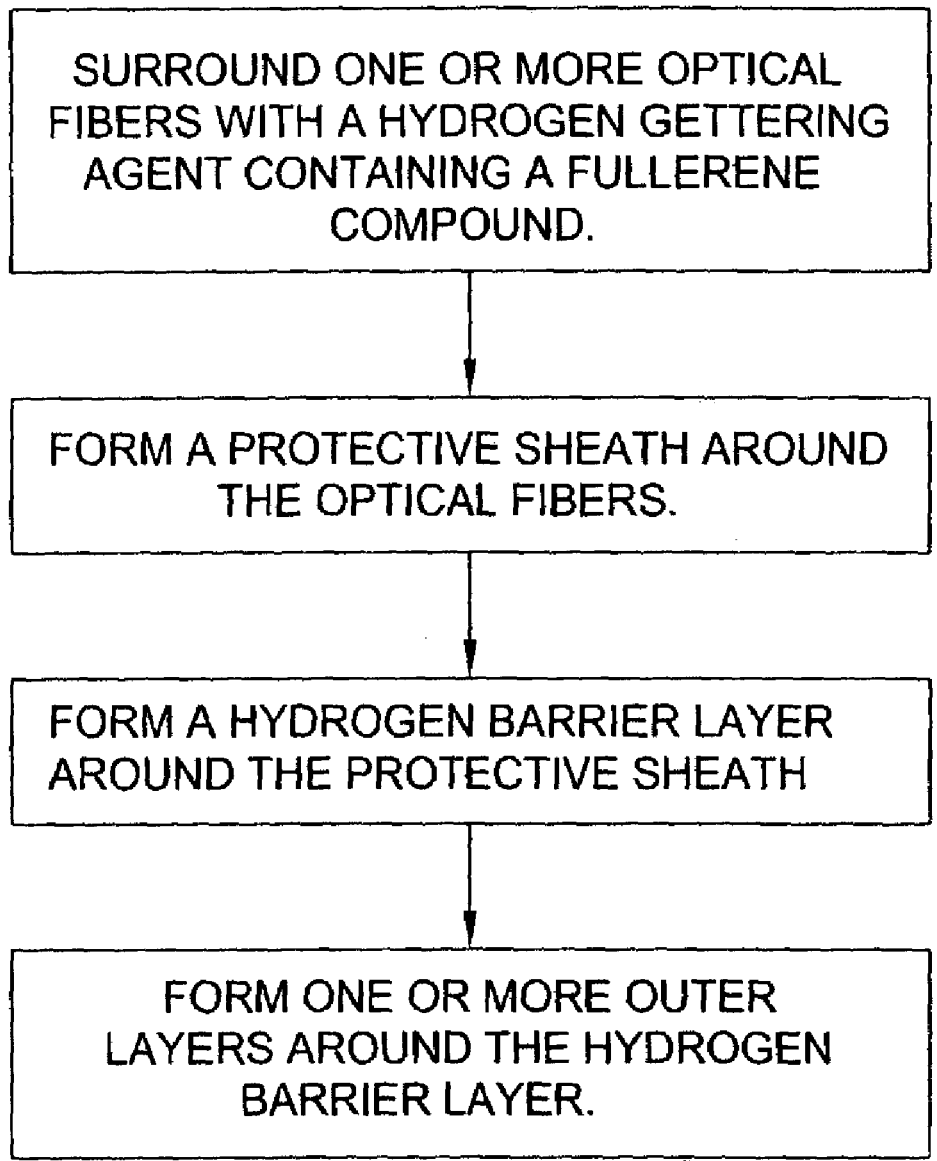
FIG. 4 is a flowchart detailing a method of manufacturing one embodiment of the present invention.

Surrounding the protective sheath 13 is a barrier layer 19 of low hydrogen permeability material, such as tin, aluminum, copper, gold, carbon, or other suitable low hydrogen permeability material. Alternatively, the protective sheath 13 may be coated or plated with the barrier layer 19. The thickness of the barrier layer 19 is selected to provide a barrier to a high partial pressure hydrogen environment. Depending upon the selection of material, the barrier layer thickness may be in the range of 0.1 to 15 microns. For example, a carbon layer may have a thickness as thin as 0.1 microns, while a tin layer may be approximately 1.3 microns in thickness. The barrier layer 19 may be over coating 21 with a protective layer of hard, scratch resistant material, such as nickel or a polymer such as polyamide. The over coating 21 may have a thickness in the range of 2 to 15 microns, depending on the material. A method of manufacturing such a fiber optic cable is illustrated by the flowchart in FIG. 4.

Figure 3:
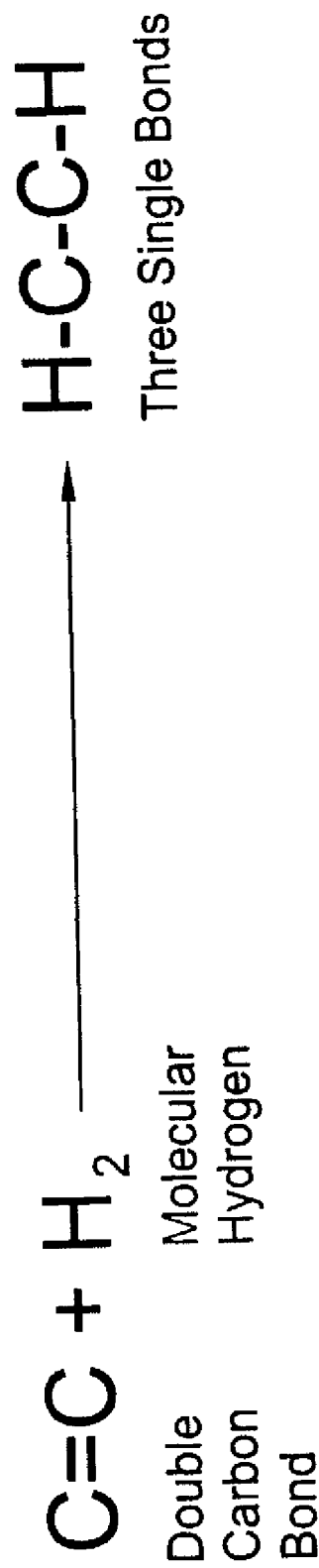
FIG. 3 illustrates the hydrogenation of a carbon double bond that exemplifies the advantages of the present invention.

The protective sheath 13 is filled with a hydrogen gettering agent 22, which fills the void spaces within the protective sheath 13 and surrounds the optical fibers 16, 17. Alternate designs may be envisioned in which the gettering agent 22 surrounds the optical fibers 16, 17; for example, the gettering agent 22 may be used as a coating on one or more components of the cable 10 (e.g., the protective sheath, 13, the optical fibers 16, 17), or it may be incorporated into the material of the sheath 13 or an outer layer (e.g., in a silicone resin). Additional layers of gettering agent 22 may even be provided between the sheath 13 and outer cable layers. As illustrated in FIG. 2, the gettering agent 22 is in intimate contact with the optical fibers 16, 17. The function of the gettering agent 22 is to scavenge any hydrogen that passes through the hydrogen barrier layer 19. The gettering agent 22 of the present invention consists of fullerene molecules 25 dissolved or suspended in an organic gel such as Sepigel, petroleum jelly, or a synthetic silicone gel. In the embodiment illustrated in FIG. 2, buckminsterfullerene ($C_{60}$) is incorporated in the gettering agent 22. Because fullerene compounds are characterized by double carbon bonds (C=C), $C_{60}$ features a high degree of unsaturation that provides sites for hydrogenation; that is, it is particularly adept at scavenging environmental $H_2$, because the hydrogen will add across (i.e., react with) the double bonds present in the gettering agent 22 (via the $C_{60}$ component) before it can permeate the optical fibers 16, 17. FIG. 3 illustrates the saturation of a double carbon bond (such as those present in fullerene compounds) by a hydrogen molecule.

Furthermore, typical unsaturated organic compounds found in commercially available gettering agents require a catalyst to promote any appreciable hydrogenation; however, the use of $C_{60}$ in a gettering agent has been shown to reduce the need for a catalyst. For example, it has been shown that thermodynamically favorable reactions of up to thirty-six hydrogen molecules per one $C_{60}$ molecule can be achieved without the use of a catalyst. Adding a catalyst may achieve an even higher ratio of hydrogenation. In addition, fullerene compounds in general exhibit high degrees of solubility in organic solvents, making them particularly well suited for incorporation into commercial gettering gels.

Thus a gettering agent containing $C_{60}$ in a gel agent or coating can be applied to or incorporated in a fiber optic cable to improve hydrogen gettering efficiency. The efficiency of this resultant gettering agent will be proportional to the concentration of $C_{60}$. It is estimated that a one-percent addition to Sepigel will increase gettering by an order of magnitude. Based on the solubility of the particular fullerene in a chosen solvent (gel), concentrations from 0.01% to 50% can be deployed. However, a fullerene concentration between 0.1% and 3% may result in optimal stability.

Further, the improved gettering capacity resulting from the use of a fullerene compound in the hydrogen gettering agent will reduce, and in some cases eliminate, the need for a hydrogen barrier layer 19, making the production of the fiber optic cable 10 less complex and less costly.

While the preceding description has focused primarily on downhole applications, embodiments of the present invention may also be used in applications. For example, in applications with less demanding temperatures and $H_2$ partial pressures, such as in undersea telecommunications cables, the invention could be implemented as a fullerene impregnated thermoplastic sheath over an optical fiber or fibers.

Thus the present invention represents a significant advancement in the field of hydrogen gettering agents for fiber optic cable design. The gettering agent incorporates a fullerene compound that improves hydrogen gettering efficiency so dramatically that the need for both a hydrogenation catalyst and a hydrogen barrier layer on portions of the cable is either reduced or eliminated. Therefore, cable designs may be achieved that are more hydrogen resistant and may be deployed at higher temperatures and higher $H_2$ partial pressures. Furthermore, the optical power of the fiber optic cable is maintained, while the overall complexity and cost of the cable design is reduced.

While the foregoing is directed to embodiments of the invention, other and further embodiments of the invention may be devised without departing from the basic scope thereof, and the scope thereof is determined by the claims that follow.

What is claimed is:

1. A fiber optic cable comprising
a protective sheath;
at least one optical fiber positioned within the protective sheath; and
a hydrogen gettering agent surrounding the at least one optical fiber, wherein the gettering agent contains buckminsterfullerene to scavenge hydrogen within the protective sheath of the cable before the hydrogen permeates the at least one optical fiber.

2. The fiber optic cable of claim 1, wherein the gettering agent coats one or more components of the cable.

3. The fiber optic cable of claim 1, wherein the gettering agent has a buckminsterfullerene concentration in the range of 0.01 to fifty percent by weight.

4. The fiber optic cable of claim 3, wherein the buckminsterfullerene concentration is in the range of 0.1 to three percent by weight.

5. The fiber optic cable of claim 1, wherein the cable further comprises a hydrogen barrier layer surrounding the gettering agent.

6. The fiber optic cable of claim 5, wherein the hydrogen barrier layer comprises a coating on the protective sheath.

7. The fiber optic cable of claim 1, wherein the protective sheath comprises a metal tube.

8. A fiber optic sensor system for down-hole use comprising:
a fiber optic cable having a first end and a second end, the first end being coupled to a fiber optic sensor within a well bore and the second end being coupled to optical processing equipment at a surface of the well bore, and wherein the cable comprises:
a protective sheath,
at least one optical fiber positioned within the protective sheath,
a hydrogen barrier layer to substantially prevent permeation of hydrogen through the cable to the at least one optical fiber, and
a gettering agent surrounding the at least one optical fiber and containing a fullerene compound to scavenge the hydrogen within the hydrogen barrier layer before the hydrogen permeates the at least one optical fiber.

9. A fiber optic cable comprising:
at least one optical fiber;
a protective sheath surrounding the at least one optical fiber;
a hydrogen gettering agent surrounding the at least one optical fiber, wherein the gettering agent contains a fullerene compound to scavenge hydrogen within the cable before the hydrogen permeates the at least one optical fiber;
a hydrogen barrier layer surrounding the protective sheath; and
one or more outer layers surrounding the hydrogen barrier layer.

10. The fiber optic sensor system of claim 8, wherein the gettering agent has a fullerene concentration in the range of 0.01 to fifty percent by weight.

11. The fiber optic sensor system of claim 10, wherein the fullerene concentration is in the range of 0.1 to three percent by weight.

12. The fiber optic sensor system of claim 11, wherein the hydrogen barrier layer comprises a coating on the protective sheath.

13. The fiber optic sensor system of claim 9, wherein the fullerene compound comprises buckminsterfullerene.

14. The fiber optic sensor system of claim 9, wherein the gettering agent has a fullerene concentration in the range of 0.01 to fifty percent by weight.

15. The fiber optic sensor system of claim 14, wherein the fullerene concentration is in the range of 0.1 to three percent by weight.

16. The fiber optic sensor system of claim 9, wherein the hydrogen barrier layer comprises a coating on the protective sheath.

17. A fiber optic cable, comprising:
at least one optical fiber;
a protective sheath surrounding the at least one optical fiber;
a hydrogen gettering agent surrounding the at least one optical fiber, wherein the gettering agent contains a fullerene compound to scavenge hydrogen within the cable before the hydrogen permeates the at least one optical fiber; and
a hydrogen barrier layer surrounding the gettering agent.

* * * * *